(12) United States Patent
Raveendran

(10) Patent No.: US 8,948,822 B2
(45) Date of Patent: Feb. 3, 2015

(54) COORDINATING POWER MANAGEMENT FUNCTIONS IN A MULTI-MEDIA DEVICE

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1052 days.

(21) Appl. No.: 12/427,628

(22) Filed: Apr. 21, 2009

(65) Prior Publication Data

US 2009/0270138 A1 Oct. 29, 2009

Related U.S. Application Data

(60) Provisional application No. 61/047,385, filed on Apr. 23, 2008, provisional application No. 61/090,176, filed on Aug. 19, 2008, provisional application No. 61/114,985, filed on Nov. 14, 2008, provisional application No. 61/114,988, filed on Nov. 14, 2008.

(51) Int. Cl.
*H04B 1/38* (2006.01)
*H04N 21/443* (2011.01)
(Continued)

(52) U.S. Cl.
CPC ......... *H04N 21/443* (2013.01); *H04N 21/4436* (2013.01); *H04N 19/61* (2013.01); *H04N 19/42* (2013.01)
USPC .......................................... 455/574; 455/572

(58) Field of Classification Search
USPC ............ 455/522, 574; 370/352, 469; 713/300
See application file for complete search history.

(56) References Cited

U.S. PATENT DOCUMENTS

| | | |
|---|---|---|
| 5,655,009 A | 8/1997 | Arai et al. |
| 6,366,615 B2 | 4/2002 | Kato et al. |
| 6,408,099 B2 | 6/2002 | Tan |

(Continued)

FOREIGN PATENT DOCUMENTS

| | | |
|---|---|---|
| CN | 1394443 A | 1/2003 |
| CN | 1122908 C | 10/2003 |

(Continued)

OTHER PUBLICATIONS

International Preliminary Report on Patentability—PCT/US2009/054369, The International Bureau of WIPO—Geneva, Switzerland, Dec. 16, 2010.

(Continued)

*Primary Examiner* — Peguy Jean Pierre
(74) *Attorney, Agent, or Firm* — Matthew Evans; Elaine H. Lo

(57) ABSTRACT

In general, this disclosure relates to techniques for dynamically determining configuration information (e.g., for processing video data) and coordinating execution of power management functions based upon an available amount of power for execution of a multi-media service. One example method includes the following features: obtaining an amount of available power for execution of a service requiring multi-media resources within a multi-media device; determining, based upon the amount of available power, configuration information for execution of one or more power management functions in one or more multi-media resources of the multi-media device; and coordinating the execution of the one or more power management functions in the one or more multi-media resources based upon the configuration information in order to manage power utilization within the multi-media device.

43 Claims, 7 Drawing Sheets

(51) Int. Cl.
*H04N 19/61* (2014.01)
*H04N 19/42* (2014.01)

(56) References Cited

U.S. PATENT DOCUMENTS

| | | | |
|---|---|---|---|
| 6,507,618 | B1 | 1/2003 | Wee et al. |
| 6,968,441 | B1* | 11/2005 | Schnee ............... 711/173 |
| 7,016,812 | B2* | 3/2006 | Aritsuka et al. ......... 702/188 |
| 7,111,177 | B1 | 9/2006 | Chauvel et al. |
| 7,142,204 | B2 | 11/2006 | Shiotsu et al. |
| 7,337,339 | B1 | 2/2008 | Choquette et al. |
| 7,376,437 | B2* | 5/2008 | Molkdar et al. ......... 455/522 |
| 7,450,963 | B2 | 11/2008 | Krishnan et al. |
| 7,721,011 | B1* | 5/2010 | Sutera ............... 710/6 |
| 7,795,752 | B2* | 9/2010 | Gorman et al. ......... 307/9.1 |
| 7,885,926 | B2* | 2/2011 | Grace et al. ........... 707/624 |
| 7,920,584 | B2* | 4/2011 | Matterne et al. ........ 370/412 |
| 7,941,677 | B2* | 5/2011 | Penning .............. 713/300 |
| 7,961,756 | B1* | 6/2011 | Lambert et al. ......... 370/469 |
| 8,041,967 | B2 | 10/2011 | Belady et al. |
| 8,122,267 | B2* | 2/2012 | Rui et al. ............ 713/300 |
| 8,125,936 | B2 | 2/2012 | Bar-Shalom |
| 8,126,461 | B2* | 2/2012 | Sengupta et al. ......... 455/435.2 |
| 8,159,520 | B1 | 4/2012 | Dhanoa et al. |
| 8,225,112 | B2* | 7/2012 | Koul et al. ........... 713/300 |
| 2001/0001016 | A1 | 5/2001 | Tan |
| 2001/0004404 | A1 | 6/2001 | Itokawa |
| 2003/0007566 | A1 | 1/2003 | Peng et al. |
| 2003/0108100 | A1 | 6/2003 | Sekiguchi et al. |
| 2003/0217295 | A1 | 11/2003 | Sadowski |
| 2004/0041538 | A1 | 3/2004 | Sklovsky |
| 2004/0142733 | A1* | 7/2004 | Parise ................ 455/572 |
| 2004/0158878 | A1 | 8/2004 | Ratnakar et al. |
| 2005/0101319 | A1 | 5/2005 | Murali et al. |
| 2005/0136961 | A1* | 6/2005 | Simonsson et al. ........ 455/522 |
| 2005/0237380 | A1 | 10/2005 | Kakii et al. |
| 2005/0276504 | A1 | 12/2005 | Chui et al. |
| 2006/0015508 | A1 | 1/2006 | Kondo et al. |
| 2006/0067406 | A1 | 3/2006 | Kitada et al. |
| 2006/0085794 | A1 | 4/2006 | Yokoyama |
| 2006/0095942 | A1 | 5/2006 | Van Beek |
| 2006/0133495 | A1 | 6/2006 | Ye et al. |
| 2006/0291812 | A1 | 12/2006 | Takezaki |
| 2007/0021140 | A1* | 1/2007 | Keyes et al. ........... 455/522 |
| 2007/0050647 | A1 | 3/2007 | Conroy et al. |
| 2007/0116124 | A1 | 5/2007 | Wu et al. |
| 2007/0150592 | A1 | 6/2007 | Bell |
| 2007/0173283 | A1* | 7/2007 | Livet et al. ............ 455/552.1 |
| 2007/0220291 | A1 | 9/2007 | Stufflebeam |
| 2007/0226522 | A1 | 9/2007 | Aleksic et al. |
| 2007/0283128 | A1 | 12/2007 | Hoshaku |
| 2007/0297511 | A1 | 12/2007 | Chiu et al. |
| 2008/0010473 | A1 | 1/2008 | Harris |
| 2008/0031356 | A1 | 2/2008 | Uchida et al. |
| 2008/0074537 | A1 | 3/2008 | Kageyama et al. |
| 2008/0084491 | A1 | 4/2008 | He et al. |
| 2008/0111889 | A1 | 5/2008 | Fujita et al. |
| 2008/0252717 | A1 | 10/2008 | Moon et al. |
| 2008/0301474 | A1* | 12/2008 | Bussa et al. ........... 713/300 |
| 2008/0307240 | A1* | 12/2008 | Dahan et al. .......... 713/320 |
| 2009/0034941 | A1 | 2/2009 | Kageyama et al. |
| 2009/0059899 | A1* | 3/2009 | Bendelac ............. 370/352 |
| 2009/0091653 | A1 | 4/2009 | Kageyama et al. |
| 2009/0296815 | A1 | 12/2009 | Ngan et al. |
| 2010/0011012 | A1 | 1/2010 | Rawson |

FOREIGN PATENT DOCUMENTS

| | | |
|---|---|---|
| CN | 1522074 A | 8/2004 |
| CN | 1522541 A | 8/2004 |
| CN | 1523893 A | 8/2004 |
| CN | 1679218 A | 10/2005 |
| CN | 1695378 A | 11/2005 |
| EP | 0912063 A2 | 4/1999 |
| EP | 1096360 A1 | 5/2001 |
| EP | 1578136 A2 | 9/2005 |
| EP | 1924099 A1 | 5/2008 |
| JP | 5268275 A | 10/1993 |
| JP | 2001177827 A | 6/2001 |
| JP | 2001229040 A | 8/2001 |
| JP | 2003134156 A | 5/2003 |
| JP | 2004242308 A | 8/2004 |
| JP | 2005300943 A | 10/2005 |
| JP | 2005303738 A | 10/2005 |
| JP | 2005537546 A | 12/2005 |
| JP | 2006101322 A | 4/2006 |
| JP | 2006113767 | 4/2006 |
| JP | 2007013315 A | 1/2007 |
| JP | 2007328461 A | 12/2007 |
| JP | 2008042566 A | 2/2008 |
| JP | 2008124646 A | 5/2008 |
| JP | 2008526119 A | 7/2008 |
| JP | 2009527133 A | 7/2009 |
| JP | 2009532990 | 9/2009 |
| JP | 2010136383 | 6/2010 |
| KR | 20030061798 A | 7/2003 |
| KR | 20040072030 A | 8/2004 |
| RU | 2189120 C2 | 9/2002 |
| RU | 2305377 C2 | 8/2007 |
| TW | I246645 B | 1/2006 |
| TW | 200805047 A | 1/2008 |
| TW | 200813701 A | 3/2008 |
| TW | 200814787 A | 3/2008 |
| WO | 9810593 A2 | 3/1998 |
| WO | WO0219095 A2 | 3/2002 |
| WO | WO03005729 A1 | 1/2003 |
| WO | WO03050758 A2 | 6/2003 |
| WO | WO2006001490 | 1/2006 |
| WO | 2006069297 | 6/2006 |
| WO | WO2006109985 A1 | 10/2006 |
| WO | 2007078663 A2 | 7/2007 |
| WO | 2007115126 | 10/2007 |

OTHER PUBLICATIONS

International Search Report and Written Opinion—PCT/US2009/041452—International Search Authority, European Patent Office, Aug. 3, 2009.

Vijayalakshmi R. Raveendran, "Power and Computational Load Management Techniques in Video Processing," U.S. Appl. No. 12/336,347, filed Dec. 16, 2008.

Vijayalakshmi R. Raveendran, "Power and Computational Load Management Techniques in Video Processing," U.S. Appl. No. 12/336,362, filed Dec. 16, 2008.

Erkip et al., "Total Power Optimization For Wireless Multimedia Communication," in System Level Power Optimization for Wireless Multimedia Communication, Chapter 1, pp. 1-20, 2002.

Lu et al., "Power Efficient Multimedia Communication Over Wireless Channels," IEEE Journal on Selected Areas in Communications, vol. 21, No. 10, pp. 1738-1751, Dec. 2003.

ITU-T H.264, Series H: Audiovisual and Multimedia System Infrastructure of audiovisual services, Coding of moving video, "Advanced video coding for generic audiovisual services," Nov. 2007: 7.3.5.3 Residual Data Syntax; and 9.2 CALVLC parsing process.

MPEG-4 Video Verification Model Version 7.0, ISO/IEC/JTC1/SC29/WG11, MPEG97/N1642, No. N1642, Apr. 1, 1997, pp. 19-23, 34-37, 40-54, 86-94, found in Internet at www.cs.sfu.ca/fas-info/cs/CC/880/li/raaterial/postscript/vm7.ps.Z.

Thomas Sikora, "The MPEG-4 Video Standard Verification Model" IEEE Transactions on Circuits and Systems for Video Technology, IEEE Service Center, Piscataway, NJ, US, vol. 7, No. 1, Feb. 1, 1997, XP011014363 ISSN: 1051-8215.

Wu Si., et al., "A fast and adaptive interpolation method for video coding" Consumer Electronics, 2005. (ISCE 2005) Proceedings of the Ninth International Symposium on MACAU SAR Jun. 14-16, 2005, Piscataway, NJ, SA,IEEE, Jun. 14, 2005, pp. 80-82, XP010832121 ISBN: 978-0-7803-8920-5.

Ya-Ting Yang., et al., "Quality Enhancement of Frame Rate Up-Converted Video by Adaptive Frame Skip and Reliable Motion Extraction" IEEE Transactions on Circuits and Systems for Video

(56) References Cited

OTHER PUBLICATIONS

Technology, IEEE Service Center, Piscataway, NJ, US, vol. 17, No. 12, Dec. 1, 2007, pp. 1700-1713, XP011195144 ISSN: 1051-8215.
Taiwan Search Report—TW098113546—TIPO—Dec. 13, 2012.
Jinzenji Kumi et al., "Automatic VOP Generation and its Application to MPEG-4 Coding", Picture Coding Symposium of Japan (PCSJ99), 14th Symposium Document, Japan, The Institute of Electronics, Information and Communication Engineers, Image Engineering Research Expert Committee, Sep. 1999, pp. 73 and 74.
"Special Topic 1, MPEG4 Newest Animation Format and its Technology", C Magazine, Japan, Softbank Publishing Inc., Jan. 1, 2004, January Issue of 2004 (vol. 16, No. 1), pp. 16-37.
Sakai Y., et al., "An Adaptive Video Flow Control Method for Multimedia Terminals," Journal of The Information Processing Society of Japan, Sep. 2000, vol. 41 (9), pp. 2455-2466, ISSN: 0387-5806.

* cited by examiner

COORDINATING POWER MANAGEMENT FUNCTIONS IN A MULTI-MEDIA DEVICE

RELATED APPLICATION

This application claims the benefit of the following U.S. provisional applications, the entire content each of which is incorporated herein by reference: (1) U.S. Provisional Application No. 61/047,385 filed on Apr. 23, 2008 and entitled "POWER MANAGEMENT IN VIDEO PROCESSING;" (2) U.S. Provisional Application No. 61/090,176 filed on Aug. 19, 2008 and entitled "POWER AND COMPUTATIONAL LOAD MANAGEMENT TECHNIQUES IN VIDEO PROCESSING;" (3) U.S. Provisional Application No. 61/114,985 filed on Nov. 14, 2008 and entitled "POWER AND COMPUTATIONAL LOAD MANAGEMENT TECHNIQUES IN VIDEO PROCESSING;" and (4) U.S. Provisional Application No. 61/114,988 filed on Nov. 14, 2008 and entitled "POWER AND COMPUTATIONAL LOAD MANAGEMENT TECHNIQUES IN VIDEO PROCESSING."

TECHNICAL FIELD

This disclosure relates to power management in multi-media devices.

BACKGROUND

In multi-media communications, the transmission and use of video data may significantly increase transmission bandwidth and data storage requirements. In many instances, video data may be encoded, or compressed, in order to reduce the size of transmitted video data. Video coding and compression techniques may achieve efficient compression by reducing both temporal redundancies between video frames in a frame sequence and also spatial redundancies within a video frame. Examples of video coding and compression techniques are described by the ITU-T H.261, H.263, Motion Picture Experts Group (MPEG) 1, MPEG2, and MPEG4 standards, as well as the ITU-T H.264 standard and its counterpart, ISO/IEC MPEG-4, Part 10, i.e., Advanced Video Coding (AVC).

Temporal prediction in video-based compression, however, may increase latencies and delays across a communication network, because decoding devices may often need to wait for data contained in certain video frames in a sequence prior to decoding other video frames in the sequence. This can pose real challenges in real-time video communications. In addition, though various coding and compression techniques have been introduced that improve the amount or quality of compression, such techniques often are quite complex, causing significant power (e.g., electrical and/or processing power) consumption.

In battery-operated or handheld devices, power consumption can be a very important factor with respect to the usability of such devices. In many instances, a user may wish to prolong the life of a battery for maximum use. In addition, however, the user may wish to use the device for various video functions (e.g., gaming, video conferencing, video streaming), which can cause significant power consumption.

SUMMARY

In general, this disclosure relates to techniques for dynamically determining configuration information (e.g., configuration information for processing video data) and coordinating execution of power management functions based upon on an available amount of power for multi-media service execution in a multi-media device, such as a battery-powered or mobile device. For example, a dynamic power manager in a mobile platform may be utilized, which communicates with a resource manager, to optimize configuration of one or more multi-media resources (e.g., hardware resources) based upon available power. The power manager also may provide users and application developers with the ability to provide power-aware services, such as low power modes, to allow execution of power management functions for a given power availability within the device.

In one aspect, a method comprises the following features: obtaining an amount of available power for execution of a service requiring multi-media resources within a multi-media device; determining, based upon the amount of available power, configuration information for execution of one or more power management functions in one or more multi-media resources of the multi-media device; and coordinating the execution of the one or more power management functions in the one or more multi-media resources based upon the configuration information in order to manage power utilization within the multi-media device.

In one aspect, a computer-readable medium contains instructions for causing one or more processors to: obtain an amount of available power for execution of a service requiring multi-media resources within a multi-media device; determine, based upon the amount of available power, configuration information for execution of one or more power management functions in one or more multi-media resources of the multi-media device; and coordinate the execution of the one or more power management functions in the one or more multi-media resources based upon the configuration information in order to manage power utilization within the multi-media device.

In one aspect, a multi-media device comprises one or more multi-media resources and one or more power-management entities. The one or more power-management entities are executed by the one or more multi-media resources to: obtain an amount of available power for execution of a service requiring multi-media resources within the multi-media device; determine, based upon the amount of available power, configuration information for execution of one or more power management functions in the one or more multi-media resources; and coordinate the execution of the one or more power management functions in the one or more multi-media resources based upon the configuration information in order to manage power utilization within the multi-media device.

The techniques described in this disclosure may be implemented in hardware, software, firmware, or any combination thereof. For example, various techniques may be implemented or executed by one or more processors. As used herein, a processor may refer to a microprocessor, an application specific integrated circuit (ASIC), a field programmable gate array (FPGA), a digital signal processor (DSP), or other equivalent integrated or discrete logic circuitry. Software may be executed by one or more processors. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program storage product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

DETAILED DESCRIPTION

Figure 1:
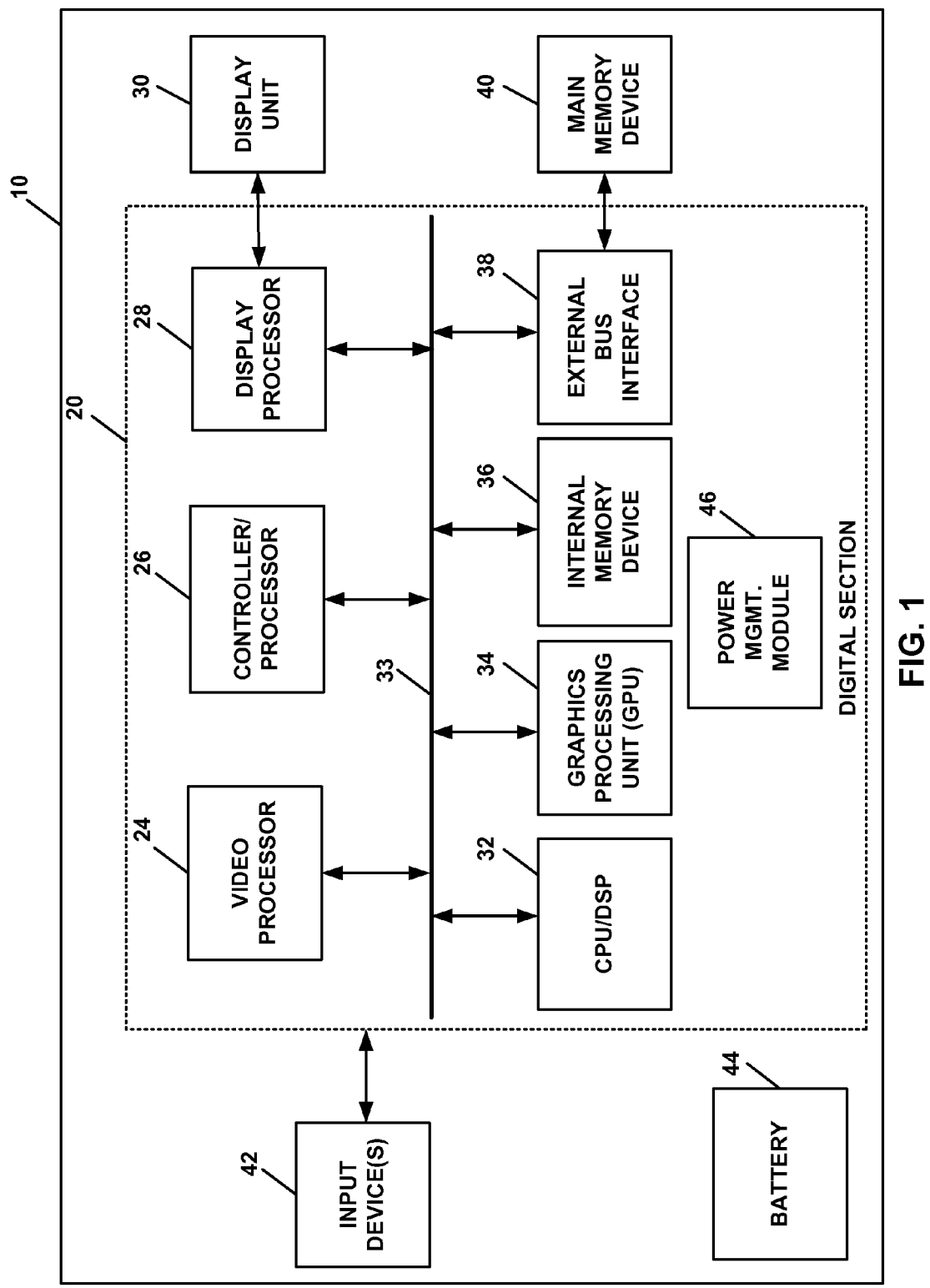
FIG. 1 is a block diagram illustrating an example of a multi-media device that includes a power management module that is capable of determining and coordinating power management functions for implementation within the device.

FIG. 1 is a block diagram illustrating an example of a multi-media device 10 that includes a power management module 46 capable of determining and coordinating power management functions within device 10. Device 10 may comprise a stand-alone device or may be part of a larger system. For example, device 10 may comprise, or be part of, a wireless communication device (such as a wireless mobile handset), a digital camera, a video camera, a video telephone, a digital multimedia player, a personal digital assistant (PDA), a video game console, a personal computer or laptop device, or other video device. Device 10 may also be included within one or more integrated circuits, or chips, which may be used in some or all of the devices described above.

Device 10 includes a digital section 20 that communicates with a display unit 30, a main memory device 40, and one or more input devices 42. Main memory device 40 may, in some examples, comprise random access memory (RAM), read-only memory (ROM), non-volatile random access memory (NVRAM), electrically erasable programmable read-only memory (EEPROM), embedded dynamic random access memory (eDRAM), static random access memory (SRAM). Display unit 30 may be any device capable of displaying image data for display purposes, such as an LCD (liquid crystal display), plasma display device, or other television (TV) display device. Input devices 42 may include one or more input units, such as, for example, a keyboard, a touchpad/screen, a stylus, a digital camera, or a microphone, to name a few.

Digital section 20 includes various processing, interface, and memory units such as, for example, a video processor 24, a controller/processor 26, a display processor 28, a central processing unit (CPU) and/or digital signal processor (DSP) 32, a graphics processing unit (GPU) 34, an internal memory device 36, and an external bus interface 38. Video processor 24 performs processing on video content (e.g., still images, moving videos, and moving texts) for video applications such as camcorder, video playback, and video conferencing. Video processor 24 may perform video encoding and decoding operations. In certain cases, the video encoding and decoding operations may be performed by another processor or shared over various processors in digital section 20.

Controller/processor 26 may direct the operation of various processing and interface units within digital section 20. For example, controller/processor 26 may control various operations within digital section 20 for one or more of video processor 24, display processor 28, CPU/DSP 32, GPU 34, and external bus interface 38. Display processor 28 performs processing to facilitate the display of video data, graphics data, and/or textual data on display unit 30. For example, display processor 28 may be configured to perform scaling, rotation, or other forms of manipulation operations on data prior to its display on display unit 30.

CPU/DSP 32 may perform various types of processing for the device 10. In some instances, controller/processor 26 may coordinate the operation of CPU/DSP 32 with one or more of video processor 24, display processor 28, or GPU 34 in order to perform certain functions within digital section 20. GPU 34 performs graphics processing. GPU 34 may be compliant, in some examples, with a document "OpenGL Specification, Version 1.0," Jul. 28, 2005, which is publicly available. This document describes a standard for 2D vector graphics suitable for handheld and mobile devices, such as cellular phones and other referred to above wireless communication apparatuses. Additionally, the GPU 34 may also be compliant, in some examples, with the OpenGL2.0, OpenGL ES2.0, or D3D9.0 graphics standards. The techniques described herein may be used for any of the processors included within digital section 20.

Internal memory device 36 may store data and/or instructions for various components within digital section 20. For example, any of video processor 24, controller/processor 26, display processor 28, CPU/DSP 32, or GPU 34 may store data and/or instructions within internal memory device 36 during operation, and may also retrieve data and/or instructions from internal memory device 36. In some instances, internal memory device 36 may comprise one or more cache elements for use within digital section 20. In these instances, any of video processor 24, controller/processor 26, display processor 28, CPU/DSP 32, or GPU 34 may access internal memory device 36 more efficiently when performing certain operations.

However, video processor 24, controller/processor 26, display processor 28, CPU/DSP 32, and/or GPU 34 may also access main memory device 40 via external bus interface 38. External bus interface 38 facilitates the transfer of data and/or instructions between digital section 20 (e.g., internal memory device 36) and main memory 40 device along a bus 33. In some cases, internal memory device 36 may be smaller in size that main memory device 40. Digital section 20 may, in certain examples, be fabricated on one or more integrated circuits (ICs).

In various cases, raw video data may be coded and compressed by video processor 24 in order to reduce the amount of information that is transmitted or processed by device 10. Compression may be performed using, for example, video coding techniques compliant with one or more of industry-adapted video compression and communication standards, including ITU-T H.261, H.263, Motion Picture Experts Group (MPEG) 1, MPEG2, and MPEG4 standards, as well as the ITU-T H.264 standard and its counterpart, ISO/IEC MPEG-4, Part 10, i.e., Advanced Video Coding (AVC). Raw and compressed video data may be transmitted to, from, or within device 10 using wireless or wired interfaces or a combination thereof. The compressed data may also be stored by device 10, such as in internal memory device 36 and/or main memory device 40. Video processor 24 may also decode and decompress any received data that has previously been encoded.

The encoding and decoding processes may involve sophisticated or complex operations that may utilize significant resources within digital section 20 (and, particularly within video processor, for example), and may also utilize significant electrical power provided by a battery 44 within device 10. Battery 44 is capable of providing electrical power to any of the components included within device 44. In some examples, battery 44 may comprise a lithium-ion battery or a nickel-based battery.

In order to help manage power within device 10, and more particularly to help identify or determine power management functions within digital section 20, digital section 20 includes a power management module 46. As will be described in further detail below, power management module 46 is capable of obtaining an amount of available power in device 10, which may comprise a multi-media device. Power management module 46 may determine, based upon the amount of available power, configuration information for execution of one or more power management functions in one or more multi-media resources of device 10. Power management module 46 may coordinate the implementation of the one or more power management functions in the one or more multi-media resources (e.g., processors) based upon the configuration information in order to manage power utilization within device 10.

In such fashion, power management module 46 may dynamically determine power-optimized processing operations (e.g., video processing operations) and/or other power-optimized configuration based upon an available amount of power (e.g., electrical or processing power) in device 10. For example, power management module 46 may be part of a dynamic power management system, which communicates with a resource manager, to provide optimizations based upon available power. Power management module 46 may be an integral part of the overall power management system in device 10 or may be one entity that includes resource manager functions.

In some cases, power management module 46 may coordinate execution of certain power-optimized processing operations by one processor in device 10 with implementation of configuration information in another processor of device 10 to implement the power management functions. In these cases, power management module 46 may reduce latencies in inter-processor communication. Without the coordination provided by power management module 46, the processors within device 10 may otherwise need to engage in additional, dynamic inter-processor communication to implement or coordinate the power management functions, which may result in additional memory utilization by the processors, as well as additional bandwidth and power consumption.

Thus, the use of power management module 46 may assist, in certain cases, with load management within device 10, including memory, power, and processor management. In some instances, power management module 46 may also assist error management within device 10, by streamlining the error management process and even determining which errors may need to be corrected based upon configuration information.

For example, in certain low-power modes that implement specific power management functions, it may not be necessary to address or correct certain types of errors that occur within device 10, which may help reduce power utilization. The power management functions provided by power management module 46 may also provide users and application developers with the ability to provide power-aware services, such as low power modes, to optimize the implementation of certain operations for a given power availability within device 10.

In one example scenario, certain low-power modes may relate to varying levels of visual quality with respect to displayed video data. For example, a user may not always need, or wish, to view the highest level of resolution or frame rate for displayed video data. Thus, certain low-power modes may provide varying levels of visual quality as perceived by a user. Power management functions corresponding to these low-power modes may be based upon varying levels, or types, of video processing, encoding and decoding operations that may be less complex (and therefore more power efficient).

Figure 2:
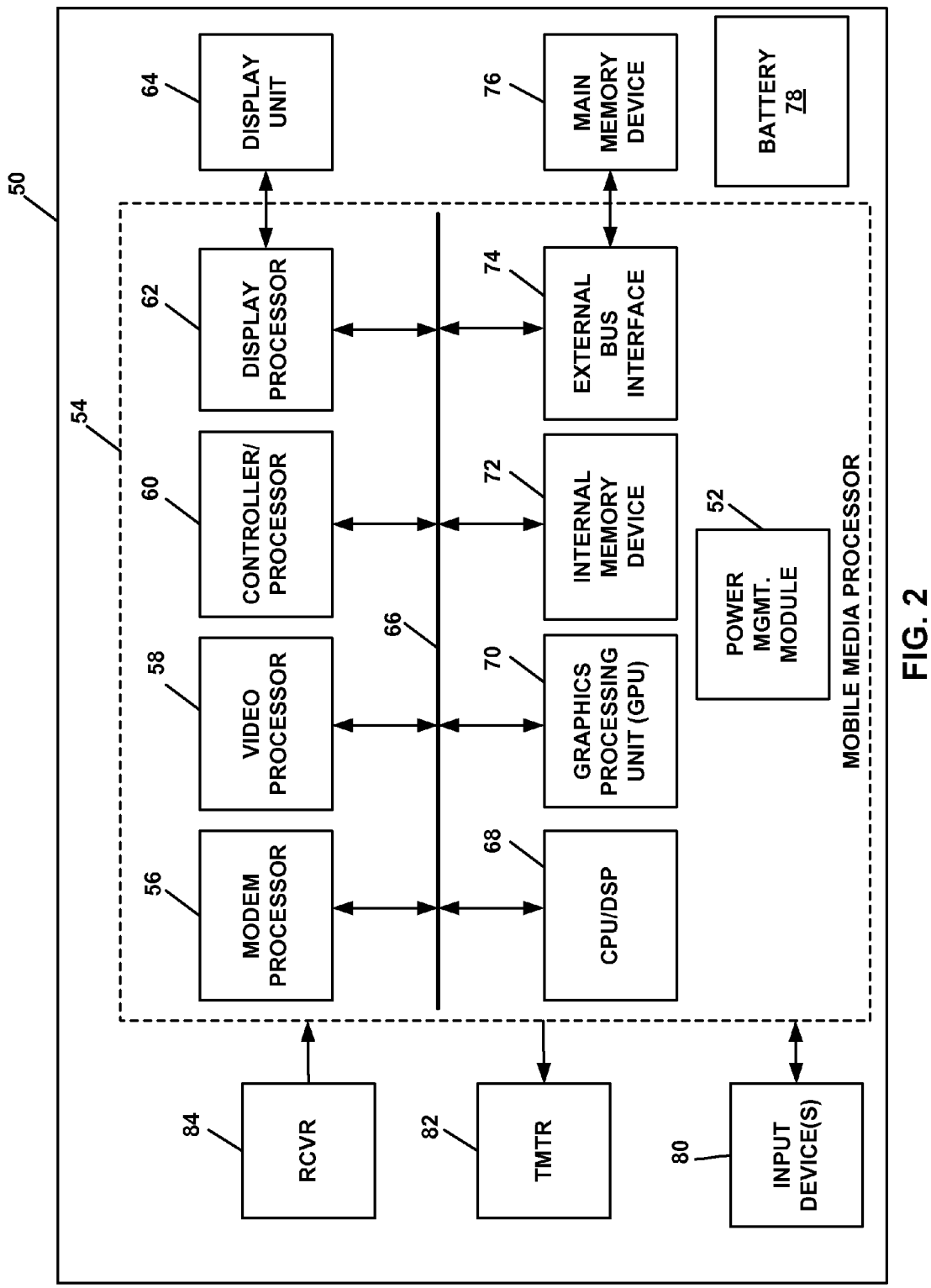
FIG. 2 is a block diagram illustrating an example of a mobile multi-media device that includes a transmitter/receiver pair, as well as a power management module that is capable of determining and coordinating power management functions within the device.

FIG. 2 is a block diagram illustrating an example of a mobile multi-media device 50 that includes a transmitter/receiver pair 82/84, as well as a power management module 52 that is capable of determining and coordinating power management functions within device 50. Power management module 52 functions in a similar fashion to power management module 46 in device 10 (FIG. 1). Device 50 may comprise, or be part of, a wireless communication device (such as a wireless mobile handset), a digital camera, a video camera, a video telephone, a digital multimedia player, a personal digital assistant (PDA), a video game console, a personal computer or laptop device, or other video or multimedia device.

Similar to device 10, device 50 of FIG. 2 includes a display unit 64, a main memory device 76, a battery 78, and one or more input devices 80. These components may, in some examples, function similarly to corresponding components that are included in device 10 (FIG. 1).

Device 50 further includes a mobile media processor 54. Similar to digital section 20 of device 10, mobile media processor 54 includes a video processor 58, a controller/processor 60, a display processor 62, a CPU/DSP 68, a GPU 70, an internal memory device 72, an external bus interface 74, bus 66, and power management module 52. Device 50 further includes a modem processor 56.

Modem processor 56 performs processing for data transmission and reception in device 50. Device 50 is capable of providing bi-directional communications via a receive path and a transmit path. On the receive path, signals transmitted by base stations or other wireless devices are received by one or more antennas (not shown) and provided to a receiver (RCVR) 84. Receiver 84 filters, amplifies, conditions and digitizes the received signal and provides samples to mobile media processor 54 for further processing. On the transmit path, a transmitter (TMTR) 82 receives data to be transmitted from mobile media processor 54, processes and conditions the data, and generates a modulated signal, which is transmitted via the one or more antennas to the base station or other remote wireless device. Receiver 84 and transmitter 82 may share a common antenna, but may also have different receive and transmit antennas, respectively.

Figure 3:
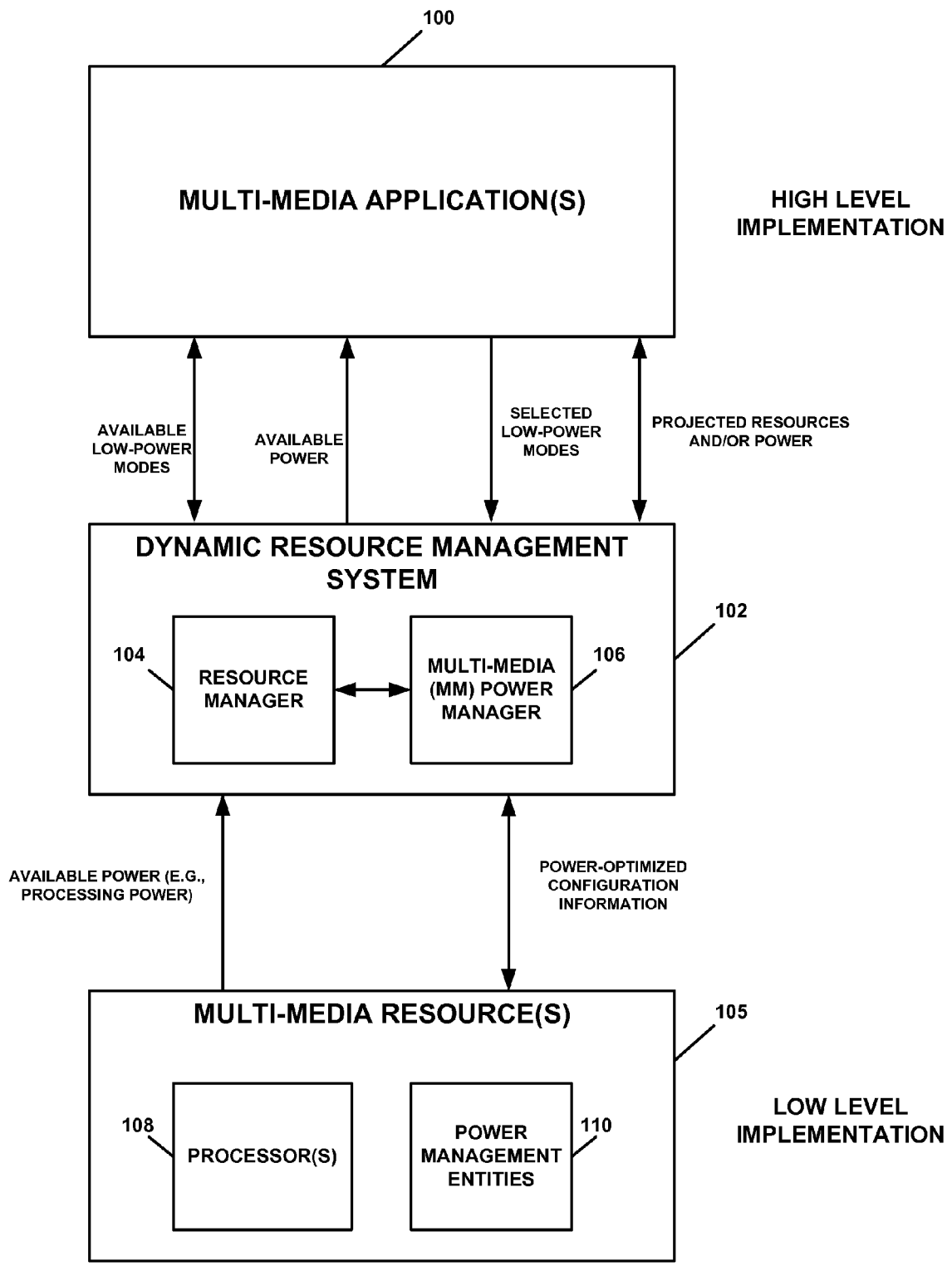
FIG. 3 is a block diagram illustrating example communication flows between one or more multi-media applications, a dynamic resource management system, and multi-media resources within a multi-media device, such as the device shown in FIG. 1 or FIG. 2, in order to determine configuration information.

FIG. 3 is a block diagram illustrating example communication flows between one or more multi-media applications 100, a dynamic resource management system 102, and one or more multi-media resources 105 within a multi-media device, such as device 10 shown in FIG. 1 and/or device 50 shown in FIG. 2, in order to determine and coordinate power management functions within resources 104 of the device. For purposes of illustration only, it will be assumed that the components shown in FIG. 3 are implemented within device 10 shown in FIG. 1.

Multi-media applications 100 represent a high-level implementation within device 10. Applications 100 may include one or more applications that have been developed by users and are capable of execution within device 10. For example, applications 100 may include various different types of video applications, such as camcorder applications, video conferencing applications, video game applications, video telephony applications, and the like. Applications 100 may be part of one or more multi-media services that may be executed by device 10 for performing various multi-media functions. Each service may require one or more multi-media resources within device 10, such as video resources.

The instructions, or code, for applications 100 may be stored in internal memory device 36 and/or main memory device 40. These instructions may then be loaded and executed by one or more of the processors included within digital section 20. In certain instances, applications 100 may include one or more power-aware services that have been developed. As will be described in further detail below, power-aware services are capable of dynamically adjusting their behavior to perform power-optimized operations based upon available power within device 10.

Figure 4:
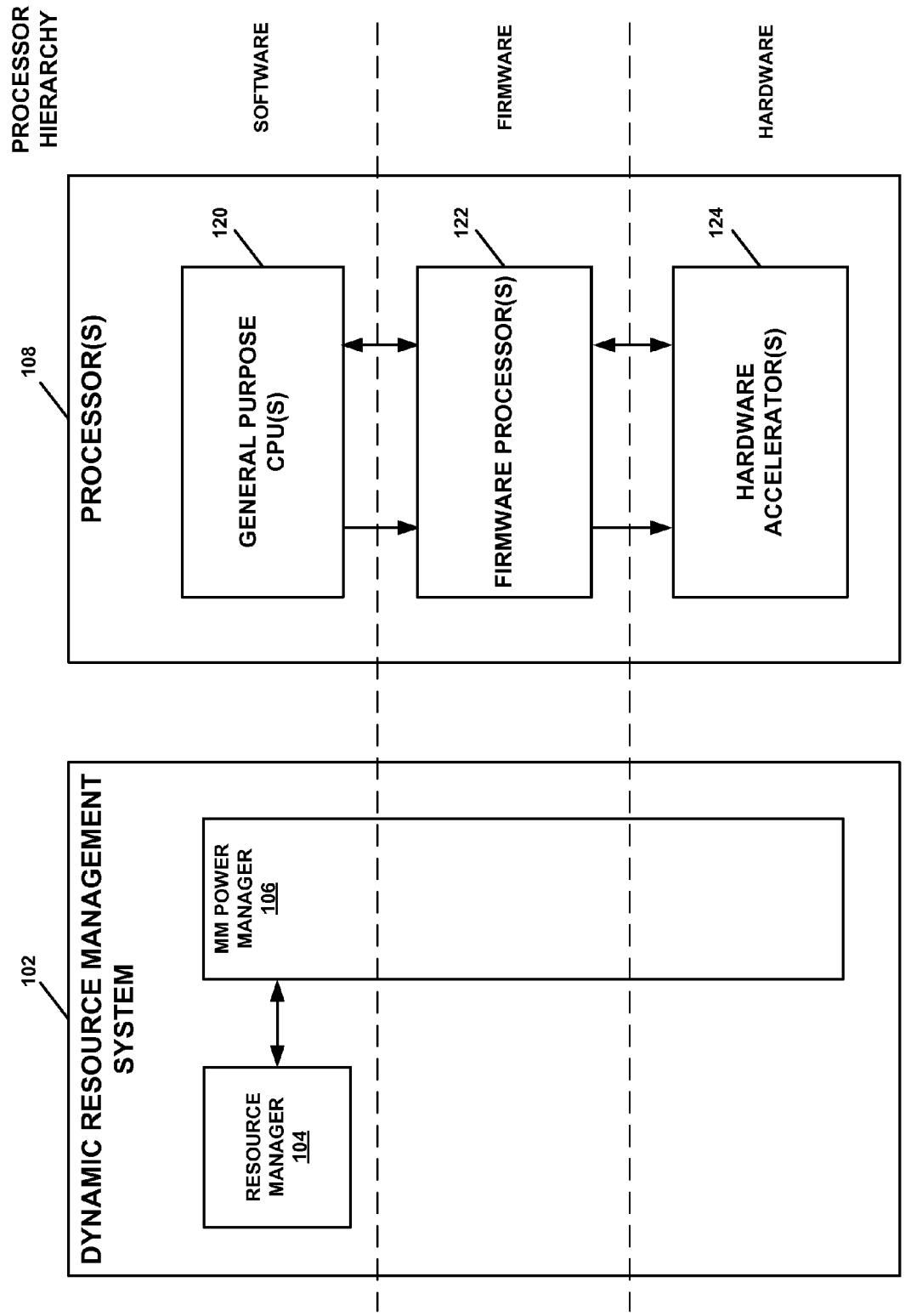
FIG. 4 is a conceptual block diagram illustrating one example of a processor hierarchy representing possible implementations of the dynamic resource management system shown in FIG. 3.

Dynamic resource management system 102 represents a dynamic system that is capable of managing resources within device 10. As shown in FIG. 4 and described in more detail below, dynamic resource management system 102 may be implemented in hardware, firmware, and/or software, and is capable of coordinating the execution of power management functions within multi-media resources 105, which represent a lower level implementation (with respect to applications 100) within device 10. Multi-media resources 105 may include one or more hardware resources, such as one or more processors 108 and one or more power management entities 110, as shown in FIG. 3.

As shown in FIG. 3, dynamic resource management system 102 includes a resource manager 104 and a multi-media power manager 106, which may be implemented in software executing on a processor. Resource manager 104 is capable of managing resources within device 10, such as multi-media resources 105. For example, resource manager 104 may manage the implementation of one or more processors 108, which are part of multi-media resources 105. Processors 108 may include one or more of the processors shown in FIG. 1 that are included within digital section 20, such as video processor 24, controller/processor 26, display processor 28, CPU/DSP 32, and/or GPU 34. In some examples, resource manager 104 may specify, or manage, which of processors 108 may be used to perform certain tasks during the execution of applications 100, or an order in which processors 108 are utilized.

Power manager 106 may be implemented in hardware, firmware, and/or software. Power manager 106 communicates with resource manager 104 in order to determine configuration information for execution of one or more power management functions within multi-media resources 105 based upon an available amount of power within device 10, as described in more detail below.

For example, in certain cases, various different low-power modes may be provided that are capable of implementing varying levels of power management. Thus, in one scenario, if a first amount of power (e.g., electrical power in milliamp hours, or processing power in MIPS (million of instructions per second)) is available within device 10, a first low-power mode may be selected. If, however, a second, lower amount of power is available, a second low-power mode may be selected. The second low-power mode may be configured to implement a greater number of power management functions within device 10 than the first low-power mode.

In one example scenario, certain low-power modes may relate to varying levels of visual quality with respect to displayed video data. For example, a user may not always need, or wish, to view the highest level of resolution or frame rate for displayed video data. Thus, certain low-power modes may provide varying levels of visual quality as perceived by a user. Power management functions corresponding to these low-power modes may be based upon varying levels, or types, of video processing, encoding and decoding operations that may be less complex (and therefore more power efficient).

The determined configuration information may include information about a selected low-power mode. In some cases, a user of an application may dynamically select a low-power mode during execution of the application. In some cases, an application (e.g., a power-aware application) may be capable of automatically selecting a low-power mode based upon an amount of available power. In one aspect, the configuration information may include information about power-optimized processing operations that are to be executed or information for controlling one or more multi-media resources for executing one or more power management functions.

Through dynamic resource management system 102, power manager 106 may be able to communicate with processors 108 and one or more power management entities 110 that are associated with processors 108. One or more power management entities 110 may be included within multi-media resources 105, as shown in FIG. 3. These power management entities are capable of dynamically modifying the behavior and configuration of processors 108, such as by changing operating voltages, clocks, and/or operating frequencies, based upon an available amount of power within device 10, or by coordinating the execution of certain power-optimized instructions.

By communicating with power manager 106 via dynamic resource management system 102, power management entities 110 are capable of executing power management functions within processors 108. Thus, in some examples, power manager 106 is able to communicate with processors 108 and power management entities 110 to coordinate these power management functions within processors 108. In one aspect, power manager 106 and power management entities 110, when considered either separately or in combination, comprise power management module 46 shown in FIG. 1.

Various data flow communications are shown in FIG. 3. For example, multi-media resources 105 are capable of providing information regarding one or more amounts of available power for processors 108 (and/or required power for execution of an application). In some cases, multi-media resources 105 may provide information regarding the amount of currently available processing power for one or more of processors 108. Dynamic resource management system 102 may communicate amounts of available power to multi-media applications 100 for use during execution. The amounts of available power that are communicated to applications 100 may include amounts of available processing power for processors 100 and/or an amount of available electrical power for battery 44 of device 10. For example, resource manager 104 may, in some cases, determine the number of milliamp-hours that are currently available for battery 44.

In some examples, applications 100 identify a set various functions that are to be implemented during application execution. For example, if one of applications 100 is a camcorder application, it may identify certain camcorder functions that are to be performed within device 10. Based upon the identification of these functions, applications 100 and/or dynamic resource management system 102 may identify an amount of projected resources and/or power that may be needed to perform the various functions during execution of the application. As noted above, dynamic resource management system 102 may, in some cases, also identify which of processors 108 are to execute certain instructions for performing the functions, or even an order in which processors 100 are to be invoked. Applications 100 and dynamic resource management system 102 may exchange and communicate information regarding projected resources and/or power.

Based upon certain factors, applications 100 and/or dynamic resource management system 102 may identify a list of available low-power modes that may be implemented within device 10. For example, applications 100 and/or dynamic resource management system 102 may identify such a list of available low-power modes based upon at least one of the available power within device 10 (e.g., electrical and/or processing power) and the projected resources/power needed for performing certain functions by applications 100.

Each of the available low-power modes may specify, or be associated with, one or more power management functions. These power management functions may be executed or implemented within one or more of processors 108. The low-power modes may, in some instances, correspond to varying different levels of power management. In one aspect, the available low-power modes may be displayed or otherwise presented to an application user. This may occur either during application configuration or dynamically during execution. The user may then select one of the low-power modes for implementation.

In other cases, in which an application may comprise a power-aware service, the application may automatically and dynamically select one of the available low-power modes for implementation. In these cases, a power-aware service may be able to dynamically modify its operation to select appropriate low-power modes to assist in the management of power utilization within device 10.

Upon selection of a low-power mode, power manager 106 may determine configuration information for execution of one or more power management functions within device 10. In one aspect, these power management functions may comprise one or more power-optimized processing operations that may be executed by one or more of processors 108. The power management functions may, in some instances, comprise hardware configurations that may be implemented by one or more of processors 108 (e.g., video processor 24).

Power manager 106 may communicate, via dynamic resource management system 102, the determined configuration information to multi-media resources 105, such as to one or more of processors 108 and/or to power management entities 110. In such fashion, power manager 106 and/or power management entities 110 may help coordinate the execution of power management functions within multi-media resources 105 (e.g., amongst multiple ones of processor 108) to manage power utilization within device 10. In some instances, one of processors 108 may execute a power management function by executing one or more power-optimized processing operations. In some instances, one of processors 108 may execute a power management function by implementing one or more hardware configurations within the processor, such as, for example, by changing operating voltages, clocks, and/or operating frequencies within the processor during its operation.

In one aspect, during the coordination process, power manager 106 and/or power management entities 110 may determine which ones of processors 108 may implement the power management functions. For example, it may be determined that one or more of processors 108 may execute certain power-optimized processing operations, and that one or more of processors 108 may implement certain hardware configurations. In addition, power manager 106 and/or power management entities 110 may determine an order in which processors 108 execute instructions or implement certain configurations based upon the configuration information. In such fashion, power manager 106 and/or power management entities can coordinate the execution of power management functions within device 10 to manage power utilization based upon the determined configuration information.

FIG. 4 is a conceptual block diagram illustrating one example of a processor hierarchy representing possible implementations of the dynamic resource management system 102 shown in FIG. 3. As described with reference to FIG. 3, dynamic resource management system 102 includes resource manager 104 and multi-media power manager 106. Power manager 106 actively communicates with resource manager 104 within dynamic resource management system 102 to determine power management functions that are to be implemented within multi-media resources 105 (FIG. 3) based upon an available amount of power in a multi-media device, such as device 10 (FIG. 1) or device 50 (FIG. 2).

As previously described with reference to FIG. 3, multi-media resources 105 include one or more processors 108. FIG. 4 shows an example of processors that may be included within processors 108. In FIG. 4, processors 108 includes one or more general purpose central processing units (CPUs) 120, one or more firmware processors 122, and one or more hardware accelerators 124. In some examples, CPUs 120 may be provided within controller/processor 26 (FIG. 1) or controller/processor 60 (FIG. 2). In some examples, hardware accelerators 124 may be provided within video processor 24 (FIG. 1) or video processor 58 (FIG. 2). Firmware processors 122 may, in some examples, include one or more digital signal processors (DSPs), one or more programmable hardware processors, and/or one or more Reduced Instruction Set Computing processors.

In the example of FIG. 4, the shown processors 108 are divided into three groups according to the following processor hierarchy: processors configured to execute software instructions; processors configured to execute firmware instructions; and processors configured to implement certain functions directly in hardware. Certain processors may execute software instructions that are stored in random-access memory. Some processors may execute firmware instructions that are stored in read-only memory. In one aspect, internal memory device 36 (FIG. 1), main memory device 40 (FIG. 1), internal memory device 72 (FIG. 2), and/or main memory device 76 (FIG. 2) may comprise read-only memory, random-access memory, or a combination thereof.

FIG. 4 shows an example where the one or more CPUs 120 processors are configured to execute software instructions and the one or more firmware processors 122 are configured to execute firmware instructions. Hardware accelerators 124 are configured to implement certain functions directly within hardware.

The dotted lines of FIG. 4 show an example separation between the three different groups of processors in the processor hierarchy. Thus, as shown in this example, dynamic resource management system 102 may be implemented in one or more of software, firmware, and hardware, and may include functionality that is implemented in CPUs 120, firmware processors 122, and/or hardware accelerators 124.

Resource manager 104 is typically implemented within software executed by a processor. For example, resource manager 104 may include functionality that is implemented during execution of instructions by CPUs.

Power manager 106 may be implemented in one or more of software, firmware, and hardware. As a result, power manager 106 may include functionality that is implemented in CPUs 120, firmware processors 122, and/or hardware accelerators 124. In some examples, the functionality for power manager 106 may be implemented in a distributed fashion across CPUs 120, firmware processors 122, and/or hardware accelerators 124. In these examples, dynamic resource management system 102 may obtain an amount of available power for a multi-media device (e.g., device 10 or device 50).

Power manager 106 may then determine, based upon the amount of available power, one or more power management functions for implementation. For example, in certain cases, various different low-power modes may be provided that are capable of implementing varying levels of power management. Thus, in one scenario, if a first amount of power is available within device 10, a first low-power mode may be selected. If, however, a second, lower amount of power is available, a second low-power mode may be selected. The second low-power mode may be configured to implement a greater number of power management functions within device 10 than the first low-power mode.

The determined configuration information may include information about a selected low-power mode. In one example, the configuration information may include information about power-optimized processing operations that are to be executed or information for controlling one or more multi-media resources for executing one or more power management functions.

Power manager 106 may communicate, via resource manager 104 and dynamic resource management system 102, configuration information for the optimizations to processors 108, and help coordinate the implementation of the optimizations within the processors 108 to manage power utilization in the device. During such communication and coordination, power manager 106 may implement its functionality at one or more of the software, firmware, and hardware levels to implement the power management functions for CPUs 120, firmware processors 122, and/or hardware accelerators 124.

For example, CPUs 120 and/or firmware processors 122 may execute a power management function by executing one or more power-optimized processing instructions. The configuration information may indicate which instructions are to be executed, and where such instructions are located (e.g., locations in memory, such as in internal memory device 36 or main memory device 40 shown in FIG. 1). In some instances, the configuration information may indicate when certain power-optimized processing instructions are to be executed, or even a prioritized order, or sequence, in which such instructions are to be executed in order to manage power utilization within the multi-media device.

In some instances, hardware accelerators 124 may execute a power management function by implementing one or more hardware configurations, such as, for example, by changing operating voltages, clocks, and/or operating frequencies within one or more of hardware accelerators 124 during operation. The configuration information may indicate which hardware configurations to implement, and may also indicate when such hardware configurations are to be implemented. Power manager 106 may use the configuration information to control hardware accelerators 124 to then implement such configurations and achieve one or more power management functions.

In one aspect, during the coordination process, power manager 106 may determine which ones of processors 108 may implement the power management functions. In addition, power manager 106 may determine an order in which processors 108 execute instructions or implement certain configurations based upon the configuration information. In such fashion, power manager 106 can coordinate the execution of one or more power management functions within a multi-media device (e.g., device 10) to manage power utilization based upon the determined configuration information.

Figure 5:
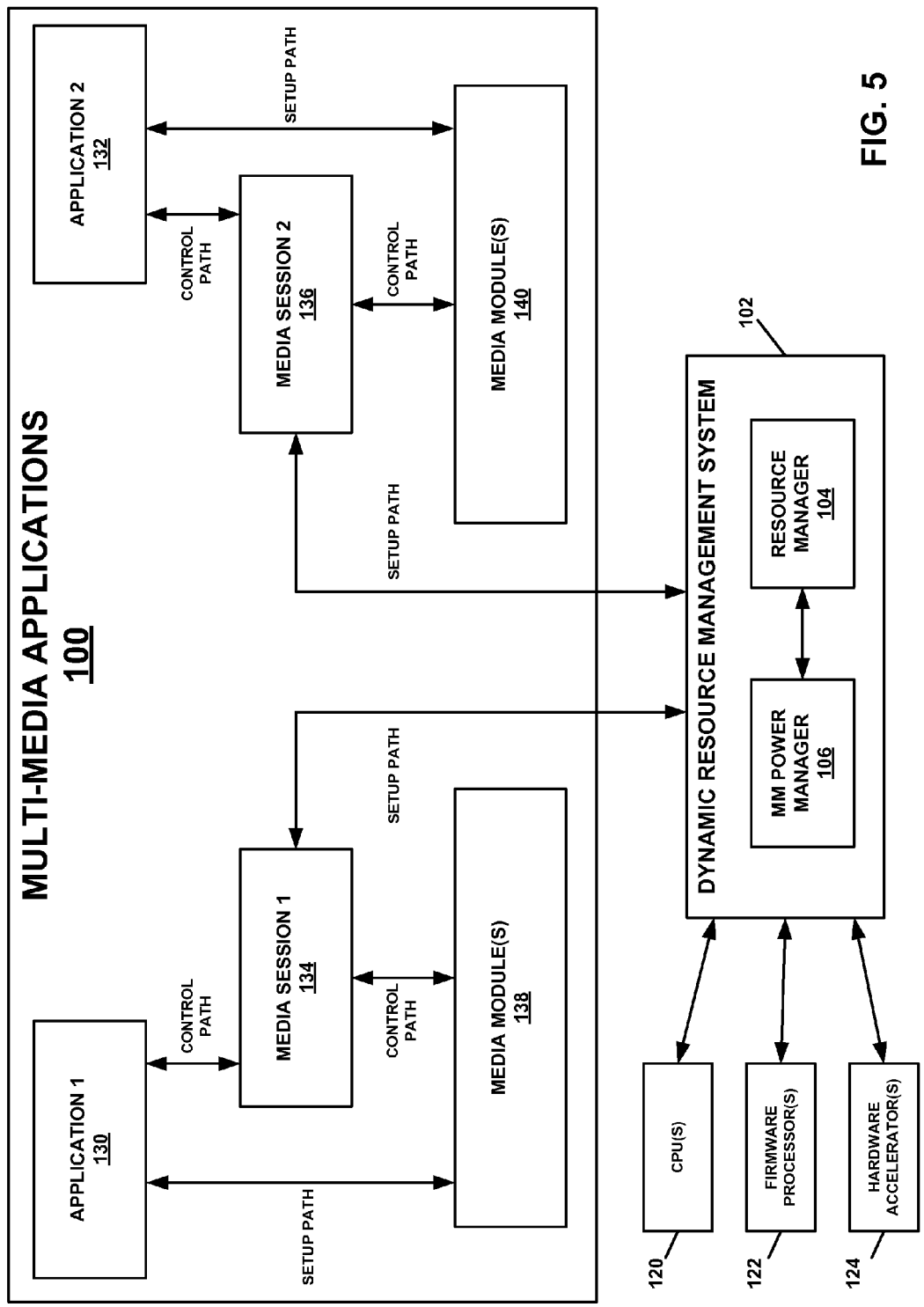
FIG. 5 is a block diagram illustrating additional details of the multi-media applications shown in FIG. 3, according to one aspect.

FIG. 5 is a block diagram illustrating additional details of the multi-media applications 100 shown in FIG. 3, according to one aspect. In the example of FIG. 5, multi-media applications 100 include a first application ("Application 1") 130 and a second application ("Application 2") 132. Applications 130 and 132 may each comprise any type of multi-media application, such as a video application (e.g., camcorder application, video game application, video telephony application, video conferencing application).

Each application 130 and 132 includes an associated media session and one or more media modules. Application 130 includes media session 134 ("Media Session 1") and one or more medial modules 138. Similarly, application 132 includes media session 136 ("Media Session 2") and one or more media modules 140. Media session 134 may perform various functions. For example, media session 134 may help set up application 130, and also determine any resources (e.g., processing or other multi-media resources) that may be needed by application 130 to perform its various functions. Similarly, media session 136 may help set up application 132, as well as determine any resources that may be needed by application 132 to perform its various functions.

Media modules 138 may comprise functional components that each performs specific tasks during execution of application 130. Media modules 138 may be interconnected and designed to communicate with each other and to exchange data. Therefore, there may be various data paths between media modules 138. To provide one example, if application 130 is a camcorder application, media session 134 may comprise a video recording session. Media modules 138 may comprise various functional components that perform specific tasks during execution of the camcorder application. For example, media modules 138 may include a camera sensor module, a camera processing module, an encoder module, and a file formatting module to write encoded data to a storage device (e.g., memory device). Data may be shared amongst these modules. For example, there may be a data path between the camera sensor module and the camera processing module, a data path between the camera processing module and the encoder module, and a data path between the encoder module and the file formatting module.

Various setup and control paths are also shown in FIG. 5. For example, application 130 has a control path with media session 134. This control path allows application 130 to control various operations or configurations of media session 134. Media session 134 has a control path with media modules 138, which allows media session 134 to control various operations or configurations of one or more of media modules 138. Application 130 has a setup path with media modules 138, which allows application 130 to aid in the setup of one or more of media modules 138 prior to task execution. In some cases, one or more of media modules 138 may not be exposed to application 130, meaning that these modules may not have setup paths with application 130. These modules may be capable of setup without interaction with application 130.

Similarly, application 132 has a control path with media session 136. This control path allows application 132 to control various operations or configurations of media session 136. Media session 136 has a control path with media modules 140, which allows media session 136 to control various operations or configurations of one or more of media modules 140. Application 132 has a setup path with media modules 140, which allows application 132 to aid in the setup of one or more of media modules 140 prior to task execution.

Media session 134 and media session 136 each also have a setup path to dynamic resource management system 102. As these are two-way setup paths, media sessions 134 and 136 can help set up certain functions or configurations within dynamic resource management system 102, and dynamic resource management system 102 can also set up certain functions or configurations within media sessions 134 and 136.

For example, as is also shown in FIG. 3, applications 100 may communicate with dynamic resource management system 102 to obtain information regarding an amount of available power in the multi-media device, available or selected low-power modes, or projected amounts of resources and/or power for performing certain functions or tasks by applications 100. Thus, the setup paths between media sessions 134, 136 and dynamic resource management system 102 aid in the setup for the processing of this type of information by applications 130, 132 and dynamic resource management system 102.

As previously described with reference to FIGS. 3 and 4, dynamic resource management system 102 is capable of communicating with, and coordinating the configuration of, various multi-media resources, including one or more processors. CPUs 120, firmware processors 122, and hardware accelerators 124 are shown in the example of FIG. 5. Power manager 106 communicates with resource manager 104 in dynamic resource management system 102, and is capable of communicating with CPUs 120, firmware processors 122, and hardware accelerators 124 via dynamic resource management system 102.

In one aspect, dynamic resource management system 102 may obtain an amount of available power in a multi-media device, such as device 10 (FIG. 1) or device 50 (FIG. 2). The available power may comprise available electrical and/or processing power. Power manager 106 may interact with resource manager 104 and determine, based upon the amount of available power, configuration information for execution of one or more power management functions in the device. Power manager 106 may communicate, via dynamic resource management system 102, the configuration information to CPUs 120, firmware processors 122, and hardware accelerators 124 and coordinate the implementation of the optimizations within these resources to manage power utilization in the device, such as, for example, as was previously described with reference to FIG. 4.

Figure 6:
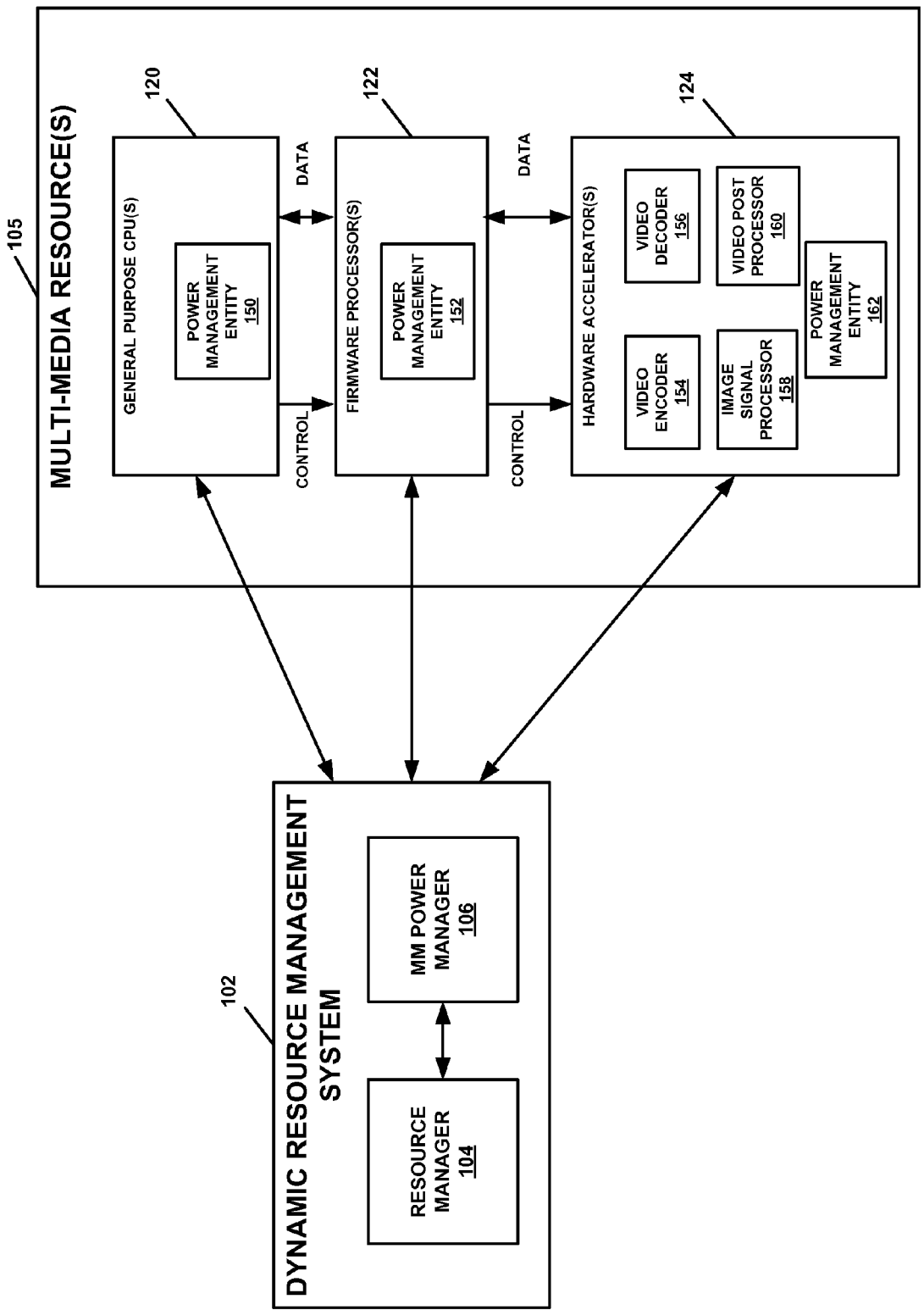
FIG. 6 is a block diagram illustrating additional details of the dynamic resource management system and the communication flow with the multi-media resources shown in FIG. 3, according to one aspect.

FIG. 6 is a block diagram illustrating additional details of the dynamic resource management system 102 and the communication flow with the multi-media resources 105 shown in FIG. 3, according to one aspect. As previously described, dynamic resource management system 102 includes resource manager 104 and multi-media power manager 106 that communicates with resource manager 104. In one aspect, resource manager 104 may be implemented within software, while power manager 106 may be implemented with software, firmware, and/or hardware (as shown in the conceptual diagram of FIG. 4).

In the example of FIG. 6, multi-media resources 105 include CPUs 120, firmware processors 122, and hardware accelerators 124. Hardware accelerators 124 include a video encoder 154, a video decoder 156, an image signal processor 158, and a video post processor 160. Video encoder 154 and video decoder 156 are capable of performing video encoding and decoding operations, respectively. Image signal processor 158 is capable of performing signal processing on images to produce characteristics and/or parameters related to the images and camera processing. Video post processor 160 is capable of processing and preparing image data for display purposes, and may communicate with a display processor (e.g., display processor 28 in FIG. 1 or display processor 62 in FIG. 2).

Power manager 106 is capable of communicating, via dynamic resource management system 102, with multi-media resources 105. In particular, as shown in the example of FIG. 6, power manager 106 is capable of communicating with processors within multi-media resources 105, such as CPUs 120, firmware processors 122, and/or hardware accelerators 124. Each of the multi-media resources 105 shown in FIG. 6 implements a power management entity. Collectively, these entities may be part of power management entities 110 shown in FIG. 3.

CPUs 120 execute power management entity 150, which may comprise one or more software modules that are executed by CPUs 120. Firmware processors 122 execute power management entity 152, which may comprise one or more firmware modules that are executed by firmware processors 122. Hardware accelerators 124 execute power management entity 162, which may, in one example, be configured as hardware circuitry within hardware accelerators 124. In one aspect, power manager 106 may manage one or more of power management entities 150, 152, and 162. In some instances, certain functionality of power manager 106 may be distributed across power management entities 150, 152, and/or 162.

During operation, dynamic resource management system 102 may obtain an amount of available power in a multi-media device, such as device 10 (FIG. 1) or device 50 (FIG. 2). For example, the amount of available power may comprise an amount of available electrical power (e.g., for battery 44 of device 10 or battery 78 of device 50) and/or an amount of available processing power for one or more of CPUs 120, firmware processors 122, and hardware accelerators 124.

Power manager 106 may then determine, based upon the amount of available power, configuration information for execution of one or more power management functions in the device, and communicate the configuration information to multiple ones of multi-media resources 105. Power manager 106 may, in certain cases, obtain the configuration information based upon a selection of a low-power mode by one of applications 100. Power manager 106 may communicate the configuration information to CPUs 120, firmware processors 122, and hardware accelerators 124, and/or utilize the power-optimized configuration to control one or more of CPUs 120, firmware processors 122, and hardware accelerators 124 to execute one or more power management functions. More particularly, power manager 106 may, in one aspect, may communicate with or otherwise control power management entity 150 of CPUs 120, to power management entity 152 of firmware processors 122, and power management entity 162 of hardware accelerators 124 based upon the configuration information to implement the power management functions.

In some instances, CPUs 120 may execute a power management function by executing one or more power-optimized processing operations. In these instances, power management entity 150 of CPUs 120 may retrieve one or more power-optimized processing operations, or instructions, for execution by CPUs 120, based upon the determined configuration information, to execute one or more power management functions in CPUs 120. The configuration information may identify which power-optimized processing instructions to execute, and may also identify where such instructions are stored (e.g., in one or more memory devices, such as memory device 36, 40, 72, and/or 76 shown in FIGS. 1 and 2). Similarly, power management entity 152 of firmware processors 122 may retrieve one or more power-optimized instructions for execution by firmware processors 122, based upon the configuration information, to execute one or more power management functions in firmware processors 122.

In some instances, hardware accelerators 124 may execute a power management function by implementing one or more hardware configurations within the processor, such as, for example, by changing operating voltages, clocks, and/or operating frequencies within the processor during its operation. In these instances, power management entity 162 of hardware accelerators 124 may implement such hardware configurations, based upon the determined configuration information, to execute one or more power management functions within hardware accelerators 124. The configuration information may identify, for example, certain hardware configurations that are to be used, including any voltages, clocks, and/or operating frequencies for one or more of hardware accelerators, such as video encoder 154, video decoder 156, image signal processor 158, and/or video post processor 160.

In one aspect, CPUs 120 are capable of managing, or otherwise controlling, firmware processors 122. Similarly, firmware processors 122 are capable of managing, or otherwise controlling, hardware accelerators 124. As a result, power management entity 150 may be capable of controlling power management entity 152, and power management entity 152 may be capable of controlling power management entity 162. Information and data may be exchanged between CPUs 120, firmware processors 122, and hardware accelerators 124. Power manager 106 may, in some instances, determine which of processors in multi-media resources 105 are to be utilized during implementation of certain power implementations, and/or an order in which such processors are invoked.

Through communication with various ones of the multi-media resources 105, via dynamic resource management system 102, power manager 106 is capable of coordinating the execution of one or more power management functions in CPUs 120, firmware processors 122, and/or hardware accelerators 124 based upon the determined configuration information. Power manager 106 may perform such coordination through the use and assistance of power management entities 150, 152, and 162. Without power manager 106 and power management entities 150, 152, 162, multi-media resources 105 may have to dynamically perform resource arbitration and expend processing or implementation bandwidth in order to execute power management functions. However, because power manager 106 manages the coordination of the power management functions amongst the various multi-media resources 105, significant efficiencies may be realized.

For example, power management entities 150, 152, and 162 may coordinate their actions to execute power management functions within CPUs, DSPs, and hardware accelerators, respectively, based upon the configuration information that is determined by power manager 106 in dynamic resource management system 102. In some examples, power management entity 150 may control power management entity 152 to coordinate certain power management functions. Similarly, in some examples, power management entity 152 may control power management entity 162 to coordinate certain power management functions.

In such fashion, power manager 106 can, in some cases, assist in the management of power utilization within a multi-media device, reduce and possible latencies in inter-processor communications within multi-media resources 105, and facilitate more efficient arbitration of multi-media resources 105. Power manager 106 can help optimize the processing of multi-media data, including video data, based upon the amount of available power within a multi-media device. The use of power manager 106 also may allow users and application developers to utilize or create power-aware services and applications that may select low-power modes, based upon power availability within a device, and take advantage of certain power management functions. Low-power modes and specific power-optimized configurations for video processing may also help optimize a user's experience (e.g., viewing experience for displayed video data) based upon a given power for a multi-media device.

In one example scenario, certain low-power modes may relate to varying levels of visual quality with respect to displayed video data. For example, a user may not always need, or wish, to view the highest level of resolution for displayed video data. Thus, certain low-power modes may provide varying levels of visual quality (e.g., varying levels of resolution) as perceived by a user. These low-power modes may, in one example, be presented to a user for selection in a hierarchical list according to the varying levels of visual quality. Power management functions corresponding to these low-power modes may be based upon varying levels, or types, or video encoding and decoding operations that may be less complex (and therefore more power efficient).

In one aspect, low-power modes may include a hierarchical set of low-power modes for video data at various different processing levels, or layers, based upon a video encoding protocol or standard. As one example, when utilizing the MPEG standard, the hierarchical set of low-power modes may include transport layer low power modes, sequence/picture layer low-power modes, and/or slice/macroblock low-power modes. An application, either automatically or based upon user input, may select one or more of the transport layer low power modes, sequence/picture layer low-power modes, and/or slice/macroblock low-power modes when performing power-mode selection from the hierarchical list. A multi-media device, such as device 10, may then determine configuration information based upon the selected low-power mode(s) to effectuate corresponding power management functions within the device.

In the above example, the low-power modes may be selected for improved granularity and/or visual quality at each layer. Granularity may refer to the extent of video parsing or decoding operations that can be executed to maximize the resulting visual quality for a given power consumption target. As can be appreciated, the techniques described herein are not limited to the MPEG format but may be used with other video compression and/or transport protocol formats, as well.

Figure 7:
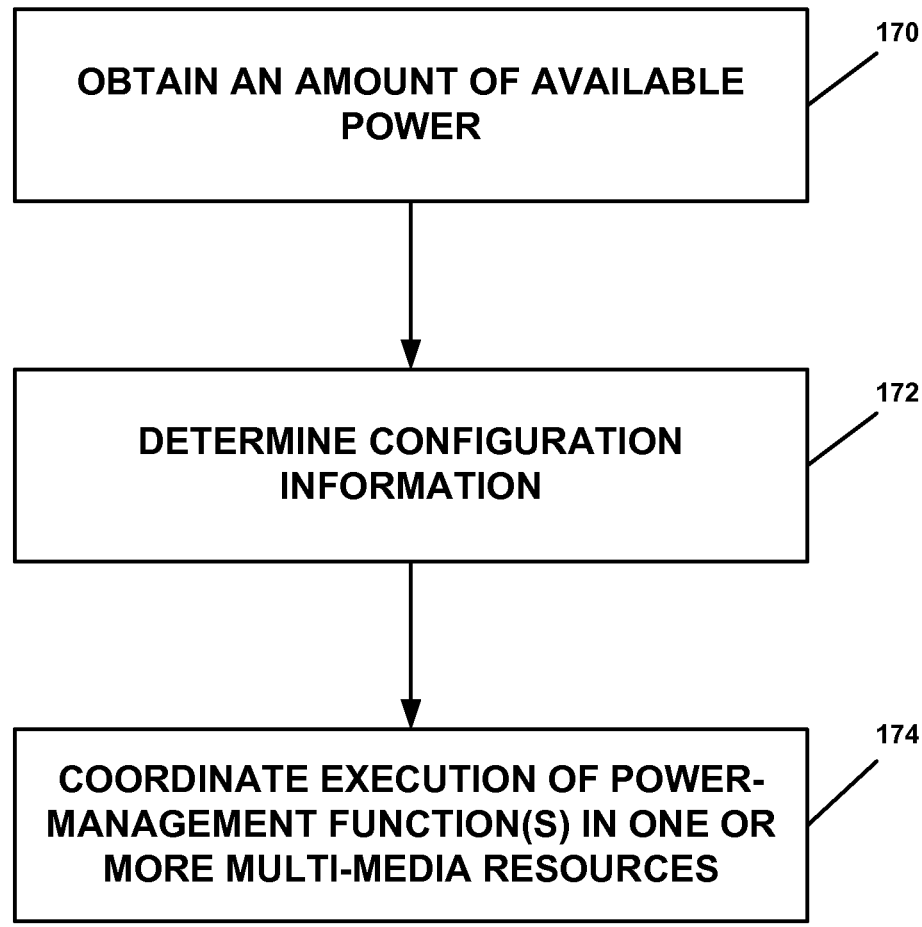
FIG. 7 is a flow diagram illustrating an example method that may be performed by a multi-media device, such as the device shown in FIG. 1 or FIG. 2.

FIG. 7 is a flow diagram illustrating an example method that may be performed by a multi-media device, such as the device shown in FIG. 1 or FIG. 2. For purposes of illustration only, it will be assumed that device 10 of FIG. 1 performs the method shown in FIG. 7. In particular, it will be assumed that dynamic resource management system 102, which may be implemented in a multi-media device, such as device 10, performs the method shown in FIG. 7.

Dynamic resource management system 102 may obtain an amount of available power (e.g., electrical and/or processing power) for execution of a service requiring multi-media resources (such as video resources) within device 10 (170). The service may include one or more multi-media applications, such as one or more of multi-media applications 100 shown in FIG. 3. Based upon the amount of available power, dynamic resource management system 102 may determine configuration information for execution of one or more power management functions in one or more multi-media resources (multi-media resources 105) of device 10 (172). Power manager 106 may, via dynamic resource management system 102, coordinate the execution of the one or more power management functions in the one or more multi-media resources 105 based upon the configuration information in order to manage power utilization within device 10 (176).

In one example scenario, certain power management functions may relate to varying levels of visual quality with respect to displayed video data. For example, a user may not always need, or wish, to view the highest level of resolution or frame rate for displayed video data. Power management functions may, in some examples, be based upon varying levels, or types, of video processing, encoding and decoding operations that may be less complex (and therefore more power efficient). In some instances, these operations may comprise a prioritized sequence of instructions that may be executed for power optimization purposes (e.g., a prioritized sequence of video decoding instructions).

Multi-media resources 105 may include multiple processors, such as one or more of CPUs 120, firmware processors 122, and hardware accelerators 124 shown in FIG. 6. In one example, the configuration information may include power-optimized processing instructions. In this example, power manager 106 may provide the power-optimized processing instructions for execution to at least a first one of the multiple processors in multi-media resources 105 in order to execute the one or more power management functions. Power manager 106 may also prioritize an order of execution of the power-optimized processing operations by the at least first one of the multiple processors based upon the configuration information, and coordinate execution of the power-optimized processing instructions for multiple different multi-media applications of the service based upon the configuration information. These multi-media applications (e.g., applications 100 shown in FIG. 3) may be executed in the multi-media device.

In one example, power manager 106, via dynamic resource management system 102, may further control at least a second one of the processors in multi-media resources 105 (e.g., one or more of hardware accelerators 124) based upon the configuration information to execute the one or more power management functions. In this example, power manager 106 may coordinate the execution of the power-optimized processing instructions by the at least first one of the multiple processors with the controlling of the at least second one of the multiple processors to execute the one or more power management functions.

In one example, power manager 106 may obtain an amount of projected power for the execution of the service. In this example, power manager 106 may determine the configuration information based upon the amount of projected power and the amount of available power in the multi-media device.

In one example, power manager 106 may determine video configuration information for execution of one or more video functions to display power-optimized video data (e.g., on display unit 30 in device 10) according to a selection of a low-power mode. In one example, a hierarchical list of selectable low-power modes may be presented based upon at least the amount of available power, and a selection of a low-power mode may be obtained from the hierarchical list. In some instances, a user may manually make a selection of a low-power mode, while, in other instances, an application (e.g., a power-aware application, such as described previously) may automatically make the selection of a low-power mode.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method for power management in a multimedia device including one or more multimedia processors, the method comprising:
obtaining an amount of available power for execution of a service requiring at least one of the one or more multi-media processors;
determining, based upon the amount of available power, configuration information for one or more power-management functions in the at least one of the one or more multi-media processors; and
coordinating execution of the one or more power-management functions in the at least one of the one or more multi-media processors based upon the configuration information.

2. The method of claim 1, wherein the configuration information comprises power-optimized processing instructions, and wherein the method further comprises providing the power-optimized processing instructions to at least a first one of the one or more multi-media processors in order to implement the one or more power management functions.

3. The method of claim 2, further comprising prioritizing an order of execution of the power-optimized processing instructions by the at least the first one of the one or more multi-media processors based upon the configuration information.

4. The method of claim 2, wherein coordinating the execution of the one or more power-management functions comprises coordinating execution of the power-optimized processing instructions for multiple multi-media applications of the service based upon the configuration information.

5. The method of claim 2, further comprising controlling a second one of the one or more multi-media processors based upon the configuration information.

6. The method of claim 5, wherein coordinating the execution of the one or more power-management functions comprises coordinating the execution of the power-optimized processing instructions by the at least the first one of the one or more multi-media processors with the controlling of the second one of the one or more multi-media processors.

7. The method of claim 1, further comprising obtaining an amount of projected power for the execution of the service, and wherein determining the configuration information is based upon the amount of projected power and the amount of available power.

8. The method of claim 1, wherein determining the configuration information comprises determining video configuration information for execution of one or more video functions to display power-optimized video data according to a selection of a low-power mode.

9. The method of claim 1, further comprising presenting a hierarchical list of selectable low-power modes based upon at least the amount of available power and obtaining a user selection of a low-power mode from the hierarchical list, wherein determining the configuration information comprises determining the configuration information according to the selected low-power mode.

10. The method of claim 1, wherein obtaining the amount of available power comprises obtaining at least one of an amount of available electrical power and an amount of processing power for the at least one of the one or more multi-media processors.

11. The method of claim 1, wherein the multi-media device includes a modem processor.

12. A multi-media device, comprising:
one or more multi-media processors; and
one or more power-management entities executed by the one or more multi-media processors to:
obtain an amount of available power in the multi-media device for execution of a service requiring one or more of the multi-media processors;
determine, based upon the amount of available power, configuration information for one or more power management functions in the one or more multi-media processors; and
coordinate execution of the one or more power management functions in the one or more multi-media processors based upon the configuration information in order to manage power utilization within the multi-media device.

13. The multi-media device of claim 12, wherein the configuration information comprises power-optimized processing instructions, and wherein the one or more power-management entities are further executed to provide the power-optimized processing instructions to at least a first one of the one or more multi-media processors in order to implement the one or more power management functions.

14. The multi-media device of claim 13, wherein the one or more power-management entities are further executed to prioritize an order of execution of the power-optimized processing instructions by the at least the first one of the one or more multi-media processors based upon the configuration information.

15. The multi-media device of claim 13, wherein the one or more power-management entities coordinate the execution of the one or more power management functions at least by coordinating execution of the power-optimized processing instructions for multiple multi-media applications of the service based upon the configuration information.

16. The multi-media device of claim 13, wherein the one or more power-management entities are further executed to control a second one of the one or more multi-media processors based upon the configuration information.

17. The multi-media device of claim 16, wherein the one or more power-management entities coordinate the execution of the one or more power management functions at least by coordinating the execution of the power-optimized processing instructions by the at least the first one of the one or more multi-media processors with the controlling of the at least second one of the one or more multi-media processors.

18. The multi-media device of claim 12, wherein the one or more power-management entities are further executed to obtain an amount of projected power for the execution of the service, and wherein the one or more power-management entities determine the configuration information based upon the amount of projected power and the amount of available power.

19. The multi-media device of claim 12, further comprising a display unit, and wherein the one or more power-management entities determine the configuration information at least by determining video configuration information for execution of one or more video functions to display, on the display unit, power-optimized video data according to a selection of a low-power mode.

20. The multi-media device of claim 12, further comprising a battery, and wherein the one or more power-management entities obtain the amount of available power by obtaining at least one of an amount of available electrical power for the battery and an amount of processing power for the one or more multi-media processors.

21. The multi-media device of claim 12, further comprising a modem processor.

22. The multi-media device of claim 12, wherein the multi-media device comprises a wireless communication device handset.

23. The multi-media device of claim 12, wherein the multi-media device comprises one or more integrated circuit devices.

24. A computer-readable medium comprising instructions for causing one or more processors to:
  obtain an amount of available power for execution of a service requiring at least one of multiple multi-media processors within a multi-media device;
  determine, based upon the amount of available power, configuration information for one or more power management functions in the at least one of multiple multi-media processors of the multi-media device; and
  coordinate execution of the one or more power management functions in the at least one of multiple multi-media processors based upon the configuration information in order to manage power utilization within the multi-media device.

25. The computer-readable medium of claim 24, wherein the configuration information comprises power-optimized processing instructions, and wherein the computer-readable medium further comprises instructions for causing the at least one of the multiple multi-media processors to provide the power-optimized processing instructions to at least a first one of the multiple multi-media processors in order to execute the one or more power management functions.

26. The computer-readable medium of claim 25, further comprising instructions for causing the at least one of the multiple multi-media processors to prioritize an order of execution of the power-optimized processing instructions by the at least the first one of the multiple multi-media processors based upon the configuration information.

27. The computer-readable medium of claim 25, wherein the instructions for causing the at least one of the multiple multi-media processors to coordinate the execution of the one or more power management functions comprise instructions for causing the at least one of the multiple multi-media processors to coordinate execution of the power-optimized processing instructions for multiple multi-media applications of the service based upon the configuration information.

28. The computer-readable medium of claim 25, wherein the computer-readable medium further comprises instructions for causing the at least the first one of the multiple multi-media processors to control a second one of the multiple multi-media processors based upon the configuration information.

29. The computer-readable medium of claim 28, wherein the instructions for causing the processors to coordinate the execution of the one or more power management functions comprise instructions for causing the processors to coordinate the execution of the power-optimized processing instructions by the at least the first one of the multiple multi-media processors with the controlling of the second one of the multiple multi-media processors to execute the one or more power management functions.

30. The computer-readable medium of claim 24, further comprising instructions for causing the at least one of the multiple multi-media processors to obtain an amount of projected power for the execution of the service, and wherein the instructions for causing the at least one of the multiple multi-media processors to determine the configuration information comprise instructions for causing the at least one of the multiple multi-media processors to determine the configuration information based upon the amount of projected power and the amount of available power.

31. The computer-readable medium of claim 24, wherein the instructions for causing the at least one of the multiple multi-media processors to determine the configuration information comprise instructions for causing the one or more processors to determine video configuration information for execution of one or more video functions to display power-optimized video data according to a selection of a low-power mode.

32. The computer-readable medium of claim 24, further comprising instructions for causing the at least one of the multiple multi-media processors to present a hierarchical list of selectable low-power modes based upon at least the amount of available power and obtain a user selection of the low-power mode from the hierarchical list, wherein the instructions for causing the at least one of the multiple multi-media processors to determine the configuration information comprise instructions for causing the at least one of the multiple multi-media processors to determine the configuration information according to the selected low-power mode.

33. The computer-readable medium of claim 24, wherein the instructions for causing the at least one of the multiple multi-media processors to obtain the amount of available power comprise instructions for causing the at least one of the multiple multi-media processors to obtain at least one of an amount of available electrical power and an amount of processing power for the one or more multi-media resources.

34. A multi-media device, comprising:
  means for obtaining an amount of available power for execution of a service requiring at least one of multiple multi-media processors within the multi-media device;
  means for determining, based upon the amount of available power, configuration information for one or more power management functions in the at least one of the multiple multi-media processors of the multi-media device; and
  means for coordinating execution of the one or more power management functions in the at least one of the multiple multi-media processors based upon the configuration information in order to manage power utilization within the multi-media device.

35. The multi-media device of claim 34, wherein the configuration information comprises power-optimized processing instructions, and wherein the multi-media device further comprises means for providing the power-optimized processing instructions to at least a first one of the multiple multimedia processors in order to implement the one or more power management functions.

36. The multi-media device of claim 35, further comprising means for prioritizing an order of execution of the power-optimized processing instructions by the at least the first one of the multiple multimedia processors based upon the configuration information.

37. The multi-media device of claim 35, wherein the means for coordinating the execution of the one or more power management functions comprises means for coordinating execution of the power-optimized processing instructions for multiple multi-media applications of the service based upon the configuration information.

38. The multi-media device of claim 35, further comprising means for controlling a second one of the multimedia multiple processors based upon the configuration information.

39. The multi-media device of claim 38, wherein the means for coordinating the execution of the one or more power management functions comprises means for coordinating the execution of the power-optimized processing instructions by the at least the first one of the multiple multimedia processors with the controlling of the second one of the multiple multimedia processors to execute the one or more power management functions.

40. The multi-media device of claim 34, further comprising means for obtaining an amount of projected power for the execution of the service, and wherein the means for determining the configuration information comprises means for determining the configuration information based upon the amount of projected power and the amount of available power.

41. The multi-media device of claim 34, wherein the means for determining the configuration information comprises means for determining video configuration information for execution of one or more video functions to display power-optimized video data according to a selection of a low-power mode.

42. The multi-media device of claim 41, further comprising means for presenting a hierarchical list of selectable low-power modes based upon at least the amount of available power and means for obtaining a user selection of a low-power mode from the hierarchical list, wherein the means for determining the configuration information comprises means for determining the configuration information according to the selected low-power mode.

43. The multi-media device of claim 34, wherein the means for obtaining the amount of available power comprises means for obtaining at least one of an amount of available electrical power and an amount of processing power for at least one of the multiple multi-media processors.

* * * * *